W. J. ORR.
Cotton-Bale Ties.

No. 142,505. Patented September 2, 1873.

Witnesses:

Inventor:
William J. Orr
Per
Attorneys.

UNITED STATES PATENT OFFICE.

WILLIAM J. ORR, OF CHARLOTTE, NORTH CAROLINA.

IMPROVEMENT IN COTTON-BALE TIES.

Specification forming part of Letters Patent No. 142,505, dated September 2, 1873; application filed August 15, 1873.

*To all whom it may concern:*

Be it known that I, WILLIAM J. ORR, of Charlotte, in the county of Mecklenburg and State of North Carolina, have invented a new and Improved Cotton-Bale Tie; and I do hereby declare that the following is a full, clear, and exact description of the same, reference being had to the accompanying drawing forming a part of this specification, in which—

Figure 1:
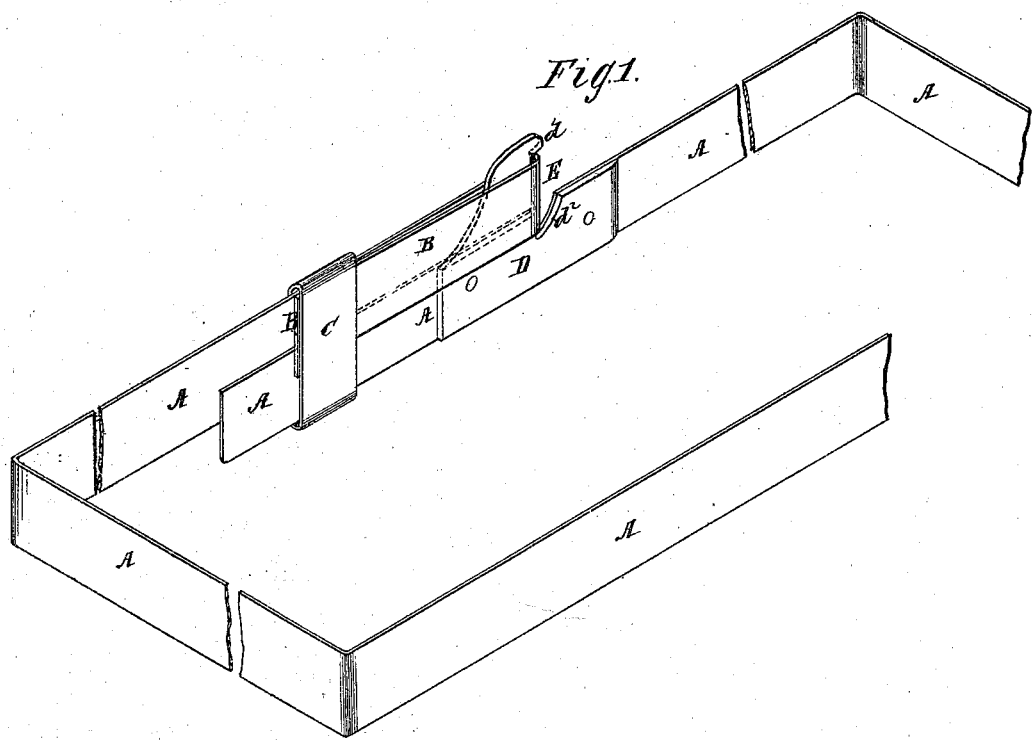
Figure 2:
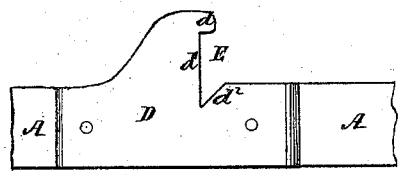

Figure 1 is a perspective view. Fig. 2 is a detail view.

The invention relates generally to bale-ties, but particularly to that class consisting of a strap of thin metal, having one end turned into the form of a hook, and the other end broadened into a transversely-slotted eye-piece, provided with a side stop at the outer end of slot. There has been experienced, practically, with these bale-ties a great deal of difficulty in turning the band after it is tightened sufficiently to secure the hook and eye together, while there is necessarily more or less play of the hook in the eye afterwards, which causes the sleeve to become displaced, and the bale to become loose and even untied. The invention consists in the peculiar mode of arranging and constructing this eye-piece, so that it can be easily inserted within the hook of the strap, and be securely held with or without the sliding sleeve or loop, which is sometimes used.

A represents an ordinary thin metallic strap, generally used for bale-ties, and having a bent end or hook, B; and C is a sliding sleeve to lock the hook to eye-piece. These devices are neither novel in themselves, nor in their use with an ordinary eye-piece, having the transverse slot entirely, or nearly, in line with the tie-strap. D is my improved metallic eye-piece, made preferably separate from the strap, and having the ordinary side stop $d$. This is riveted or otherwise firmly attached beneath and a little distance from one end of strap, so as to project at one side therefrom. $d^1$ is a face, at right angles to the length of strap, upon which rests the fold of the hook, and in front of which is an open space, E, not quite equal to the width of strap. At an oblique angle to this face a notch is cut in both the eye-piece and strap, so as to form the incline $d^2$.

By this construction, the two ends of strap having been drawn up side by side until the hook or loop end closes over the eye-piece, a scarcely palpable turn of one of the strap ends and a slight pressure of them toward one another will cause the hook to be locked securely in the eye-piece. As the two ends of strap draw in exactly opposite directions, the hook is rigidly held against the bottom of incline $d^2$, and prevented from any play whatever. Nevertheless, when it is desired to untie the bale, it is done with the same facility which distinguished the tying—merely by a slight turn of one of the strap ends, and a slight pressure of them apart.

Practical experiment with this tie has shown that it can be applied in much less time than any other good tie, while it is believed to be also considerably more secure.

Having thus described my invention, what I claim as new, and desire to secure by Letters Patent, is—

A metal-strap bale-tie having the eye-piece D $d$ set to one side of the strap A, open nearly the width of the strap in front of the face $d^1$, and having the incline $d^2$, in combination with the loop C, as and for the purpose described.

WILLIAM J. ORR.

Witnesses:
J. A. ELLIOTT,
ARCHC. GRAHAM, Jr.